US008358702B2

(12) United States Patent
Ichinose et al.

(10) Patent No.: US 8,358,702 B2
(45) Date of Patent: Jan. 22, 2013

(54) INFORMATION PROCESSING SYSTEM AND INFORMATION PROCESSING METHOD, AND PROGRAM

(75) Inventors: Tsutomu Ichinose, Tochigi (JP); Takashi Sato, Tokyo (JP); Hiroshi Mizuno, Nagano (JP)

(73) Assignee: Sony Corporation, Tokyo (JP)

( * ) Notice: Subject to any disclaimer, the term of this patent is extended or adjusted under 35 U.S.C. 154(b) by 722 days.

(21) Appl. No.: 12/407,103

(22) Filed: Mar. 19, 2009

(65) Prior Publication Data
US 2009/0257509 A1 Oct. 15, 2009

(30) Foreign Application Priority Data

Apr. 11, 2008 (JP) .................................. 2008-103983

(51) Int. Cl.
H04N 11/02 (2006.01)
(52) U.S. Cl. ............................... 375/240.25; 375/240.26
(58) Field of Classification Search . 375/240.01–240.29
See application file for complete search history.

(56) References Cited

U.S. PATENT DOCUMENTS

| | | | | |
|---|---|---|---|---|
| 5,612,900 A * | 3/1997 | Azadegan et al. | ............ | 709/247 |
| 5,748,336 A * | 5/1998 | Kakutani | .................... | 382/252 |
| 5,774,206 A * | 6/1998 | Wasserman et al. | .......... | 709/247 |
| 6,307,440 B1 | 10/2001 | Shimanuki | | |
| 6,798,839 B2 * | 9/2004 | Iwata et al. | ............... | 375/240.28 |
| 7,050,637 B2 * | 5/2006 | Akiyoshi et al. | ............... | 382/233 |
| 7,822,119 B2 * | 10/2010 | Boon et al. | ................ | 375/240.12 |
| 2005/0111542 A1* | 5/2005 | Hattori | ...................... | 375/240.01 |
| 2005/0163216 A1* | 7/2005 | Boon et al. | ............... | 375/240.12 |
| 2006/0045179 A1 | 3/2006 | Mizuno et al. | | |
| 2006/0182180 A1* | 8/2006 | Araya et al. | ............. | 375/240.24 |
| 2008/0123136 A1* | 5/2008 | Takahashi et al. | ........... | 358/1.15 |
| 2009/0086034 A1* | 4/2009 | Nakamura et al. | ......... | 348/208.4 |
| 2010/0066861 A1* | 3/2010 | Sakagami | .................. | 348/231.6 |

FOREIGN PATENT DOCUMENTS

| | | |
|---|---|---|
| JP | 11-445 | 1/1999 |
| JP | 2000-278042 | 10/2000 |
| JP | 2001-238169 | 8/2001 |
| JP | 2002-344883 | 11/2002 |
| JP | 2006-74461 | 3/2006 |

* cited by examiner

Primary Examiner — David Czekaj
Assistant Examiner — Leron Beck
(74) Attorney, Agent, or Firm — Oblon, Spivak, McClelland, Maier & Neustadt, L.L.P.

(57) ABSTRACT

An image processing system includes a division unit adapted to divide encoding target data into divided data, a distributed encoding unit adapted to encode the divided data into distributed encode data and generate decode information file including time information, a generation unit adapted to generate decode image information on the basis of specification information including time information and the decode information file, and a decoding unit adapted to decode the distributed encode data on the basis of the decode image information and output decode data corresponding to the specification information.

13 Claims, 11 Drawing Sheets

| 1 | 2 | 3 |
|---|---|---|
| Stream 1<br>Decode Information File<br>· Start TimeCode<br>(01:00:00:00)<br>· End TimeCode<br>(01:10:23:10)<br>· Duration<br>(10:23:10)<br>· Resolution<br>(1920 x 1080)<br>· FrameRate<br>(59.94i)<br>· Picture Type<br>(I,B,B,P,···) | Stream 2<br>Decode Information File<br>· Start TimeCode<br>(01:10:23:11)<br>· End TimeCode<br>(01:25:18:07)<br>· Duration<br>(14:54:26)<br>· Resolution<br>(1920 x 1080)<br>· FrameRate<br>(59.94i)<br>· Picture Type<br>(I,B,B,P,···)<br>13690:B<br>13691:B<br>13692:I<br>13693:B<br>13694:B<br>13695:P<br>13696:B<br>13697:B<br>13698:P<br>13699:B (Specified Position)<br>13700:B<br>13701:P | Stream 3<br>Decode Information File<br>· Start TimeCode<br>(01:25:18:08)<br>· End TimeCode<br>(01:40:00:00)<br>· Duration<br>(14:41:22)<br>· Resolution<br>(1920 x 1080)<br>· FrameRate<br>(59.94i)<br>· Picture Type<br>(I,B,B,P,···) |

FIG. 10A

| 1 | 2 | 3 |
|---|---|---|
| Stream 1<br>Decode Information File<br>· Start TimeCode<br>  (01:00:00:00)<br>· End TimeCode<br>  (01:10:23:10)<br>· Duration<br>  (10:23:10)<br>· Resolution<br>  (1920 x 1080)<br>· FrameRate<br>  (59.94i)<br>· Picture Type<br>  (I,B,B,P,···) | Stream 2<br>Decode Information File<br>· Start TimeCode<br>  (01:10:23:11)<br>· End TimeCode<br>  (01:25:18:07)<br>· Duration<br>  (14:54:26)<br>· Resolution<br>  (1920 x 1080)<br>· FrameRate<br>  (59.94i)<br>· Picture Type<br>  (I,B,B,P,···)<br>  13690:B<br>  13691:B<br>  13692:I<br>  13693:B<br>  13694:B<br>  13695:P<br>  13696:B<br>  13697:B<br>  13698:P<br>  13699:B (Specified Position)<br>  13700:B<br>  13701:P | Stream 3<br>Decode Information File<br>· Start TimeCode<br>  (01:25:18:08)<br>· End TimeCode<br>  (01:40:00:00)<br>· Duration<br>  (14:41:22)<br>· Resolution<br>  (1920 x 1080)<br>· FrameRate<br>  (59.94i)<br>· Picture Type<br>  (I,B,B,P,···) |

FIG. 10B

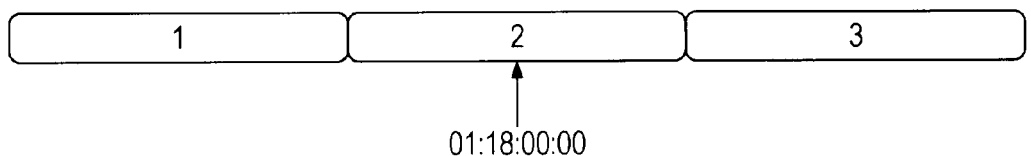

US 8,358,702 B2

INFORMATION PROCESSING SYSTEM AND INFORMATION PROCESSING METHOD, AND PROGRAM

BACKGROUND OF THE INVENTION

1. Field of the Invention

The present invention relates to an information processing system and an information processing method, and a program with which an encode parallel processing is executed.

2. Description of the Related Art

Up to now, an authoring apparatus used in a creating site of recording media such as an optical disk performs an encode processing (compression encode processing) by using, for example, an MPEG (Moving Picture Experts Group) standard on each of video data, audio data, and the like. Then, the authoring apparatus multiplexes the respective encode data obtained from results of the respective encode processings and records this multiplexed stream on the recording media.

Such an authoring apparatus allocates the bit amount that can be recorded on the recording media to each of the video data, the audio data, and the like and performs the encode processing so that the data falls within the allocated bit amount.

As an encode method for the video data, so called "two-path encode" has been proposed (for example, see Japanese Unexamined Patent Application Publication No. 2000-278042). The two-path encode is a method composed of a tentative (preliminary) encode processing and an actual encode processing.

Hereinafter, while the tentative encode processing is referred to as encode processing for the first path and the actual encode processing is referred to as encode processing for the second path, an outline of the two-path encode will be described.

An encoder performs the encode processing for the first path in which a constant encode condition is held on a series of encoding target video data. At this time, various pieces of data obtained at the time of the encode processing for the first path such as, for example, the generated bit amount, are sequentially detected in units of the frame.

Next, on the basis of the generated bit amount detected in this manner in units of the frame, the encoder performs the bit allocation for each of the frames constituting the video data. In other words, the encoder sets a target bit amount utilized in the encode processing for the second path in units of the frame.

Furthermore, the encoder assigns a picture type used in the encode processing for the second path. The assignment of the picture type refers to an assignment of an encode type to the respective frames.

To be more specific, in the MPEG, on the basis of any one of encode types including an I picture (Intra-Picture), a P picture (Predictive-Picture), and a B picture (Bidirectionally Predictive-Picture), the respective frames are encoded. The I picture refers to an encode type in which the image data of one frame is encoded as it is without utilizing the image data of other frames. In other words, the I picture refers to an encode type of an intra-frame encode processing. Also, the P picture and the B picture refers to an encode type of an in-frame encode processing. In other words, the P picture basically refers to an encode type in which a difference (predictive error) between the image data for one frame and image data for a predictive frame of the I picture or the P picture preceding the relevant image data in terms of time is obtained, and the difference is encoded. Also, the B picture basically refers to an encode type in which a difference (predictive error) between the image data for one frame and image data for a predictive frame of the I picture or the P picture preceding or following the relevant image data in terms of time is obtained, and the difference is encoded.

Therefore, the assignment of the picture type refers to an assignment of the respect frame to any of the three encode types including the I picture, the P picture, and the B picture. In other words, the assignment of the picture type can also be a configuration setting of the respective GOPs (Group Of Picture).

In this manner, after the encode processing for the first path is performed, by utilizing the processing result, the setting of the target bit amount or the assignment of the picture type is performed in units of the frame.

Next, the encode conditions including at least the picture type and the target bit amount for each frame are set, and the encode processing for the second path is executed while following the encode conditions.

That is, the encoder performs the encode processing for the second path on the video data that is the same as that for the first path and outputs the thus obtained encode video data. In more detail, the encoder sequentially encodes the data in each of the frames constituting the video data so that the data has the target bit amount at the assigned picture type. As a result, a bit stream formed by continuously arranging encode frame data of any one of the I picture, the B picture, and the P picture is output as encode video data from the encoder.

Also, as another encode method for the video data is disclosed, for example, in Japanese Unexamined Patent Application Publication No. 2002-326864 and also in Japanese Unexamined Patent Application Publication No. 2001-53570.

A method disclosed in Japanese Unexamined Patent Application Publication No. 2002-326864 is a method in which the following first to third processings are executed in the stated order. In other words, the first processing is a processing of performing the encode processing for the first path on all sections of video data. The second processing is a processing of partly performing the encode processing for the second path on data in a particular section among the video data. The third processing is a processing of replacing only the data in the particular section among the encode video data for the first path by the encode video data for the second path, and outputting the thus obtained data as the final encode video data.

In addition, a method disclosed in Japanese Unexamined Patent Application Publication No. 2001-53570 is the following method. In other words, a method of setting the target bit amount for decreasing the assignment amount in a section where no problem occurs even when the bit amount is reduced among the encode video data for the first path and assigning the relevant bit amount to another section where a problem is generated and performing the encode processing for the second path on the basis of the target bit amount is disclosed in Japanese Unexamined Patent Application Publication No. 2001-53570.

In this way, the encode processing involves high load for the bit amount computation and the like. For this reason, for example, in a case where the encode is performed on the basis of MPEG-4 AVC (H.264/AVC) which is one of codecs adopted by Blu-Ray (trademark), as the computation processing load is higher as compared with MPEG-2 adopted by DVD (Digital Versatile Disc), the encode processing time period is stretched.

In order to cope with this situation, a method of shortening the encode processing time period is proposed by distributing the encode processings to perform processings in parallel. For example, by preparing a plurality of encoding PCs (Personal Computer) having the same conditions, a material is evenly assigned by the number of the encoding PCs. As the parallel processing is executed, the H.264/AVC encode is efficiently processed, and it is possible to shorten the encode time period (see also Japanese Unexamined Patent Application Publication No. 2006-74461).

SUMMARY OF THE INVENTION

Incidentally, in a case where the encode processing is distributed, the number of streams generated through the encodes is the same as the number of distributions. Thus, a processing of joining the distributed streams into one should be performed, and the processing time period is in proportion to the length of the material to be encoded.

Therefore, in order to perform an image quality checking operation, the streams subjected to the parallel processing are joined and authoring is performed thereon. Then, a disk is created and reproduced by using a reproduction apparatus, or decode information is generated and checked on the basis of the joined streams.

In addition, in a case where a trailer movie is created which is a preview of a film, the respective materials are edited and processed to create a material dedicated to the trailer, or the authoring processing is performed after the encode and a disk is created and reproduced by using the reproduction apparatus.

The present invention has been made in view of the above-mentioned actual conditions in the related art, and it is desirable to provide an information processing system and an information processing method, and a program with which operations such as image quality check and title creation can be efficiently performed.

An image processing system according to an embodiment of the present invention includes: a division unit adapted to divide encoding target data into divided data; a distributed encoding unit adapted to encode the divided data into distributed encode data and generate decode information file including time information; a generation unit adapted to generate decode image information on the basis of specification information including time information and the decode information file; and a decoding unit adapted to decode the distributed encode data on the basis of the decode image information and output decode data corresponding to the specification information.

In addition, an image processing method according to an embodiment of the present invention includes the steps of: dividing encoding target data into divided data; encoding the divided data into distributed encode data and generating decode information file including time information; generating decode image information on the basis of specification information including time information and the decode information file; and decoding the distributed encode data on the basis of the decode image information and outputting decode data corresponding to the specification information.

In addition, according to an embodiment of the present invention, there is provided a program for instructing a computer to execute the steps of: dividing encoding target data into divided data; encoding the divided data into distributed encode data and generating decode information file including time information; generating decode image information on the basis of specification information including time information and the decode information file; and decoding the distributed encode data on the basis of the decode image information and outputting decode data corresponding to the specification information.

It should be noted that in the present specification, "system" refers to a logical aggregation of a plurality of apparatuses or function modules which realize a particular function, and whether or not the respective apparatuses or function modules are arranged in a single casing does not carry special significance.

According to the embodiments of the present invention, the division data is encoded into the division encoding data, and also the decode information time including the time information is generated. By using the specification information including the time information, without joining the division encoding data, it is possible to perform the decode operation such as reproduction, reverse reproduction, frame advance, and jump as if handing the one stream, and the operations such as image quality check and title creation can be efficiently carried out.

BRIEF DESCRIPTION OF THE DRAWINGS

FIG. 10 illustrate a decode information file example of a distributed stream.

DESCRIPTION OF THE PREFERRED EMBODIMENTS

Hereinafter, specific embodiments of the present invention will be described in detail with reference to the drawings. Herein, first, an entire configuration of an authoring apparatus is described, and subsequently an information processing system adapted to process encodes of video data in parallel will be described.

Entire Configuration

Figure 1:
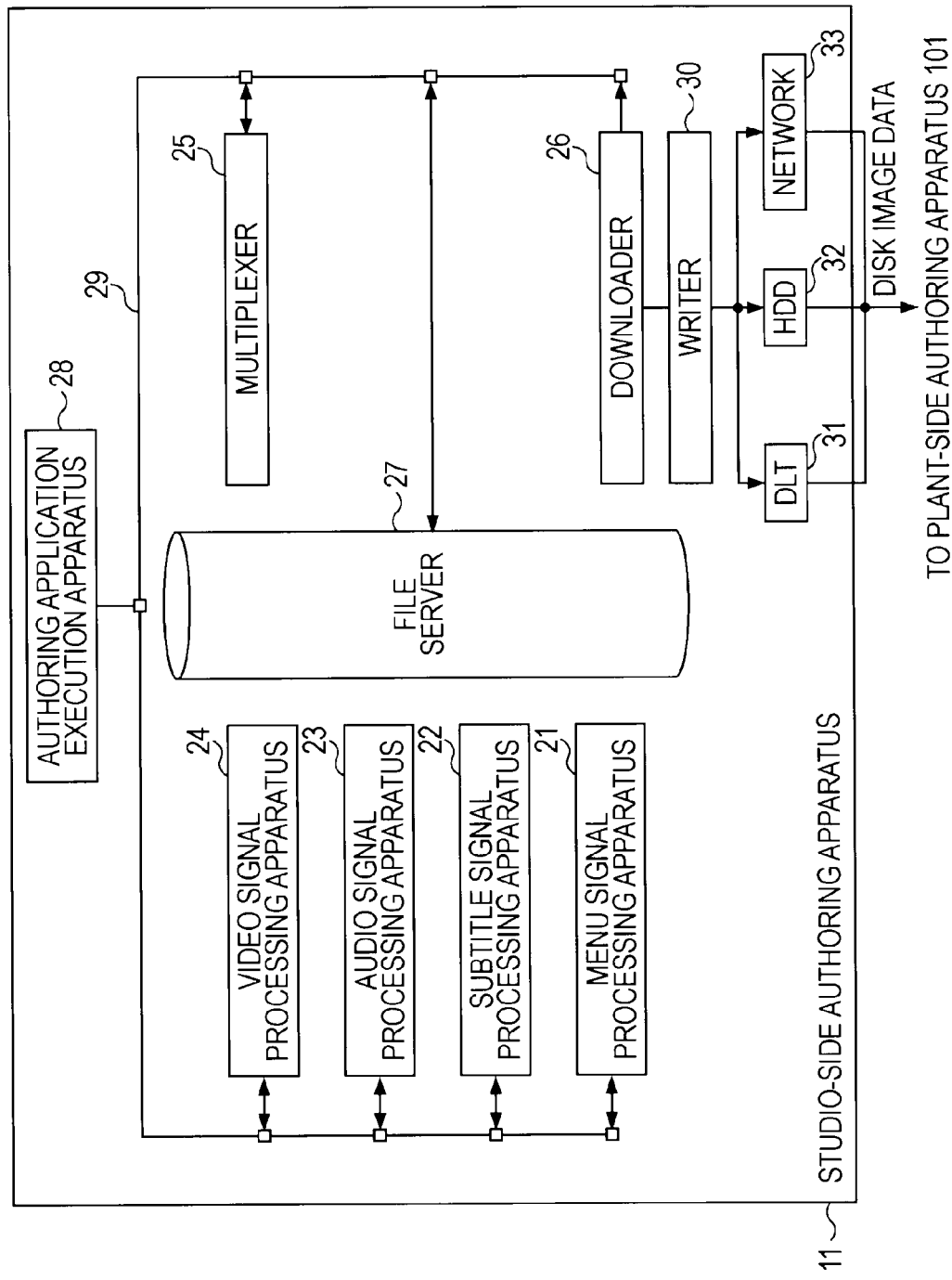
FIG. 1 is a block diagram of a configuration example of a studio-side authoring apparatus.

FIG. 1 illustrates a configuration example of an authoring apparatus installed on a studio side to which an embodiment of the present invention is applied (hereinafter, which will be referred to as "studio-side authoring apparatus").

A studio-side authoring apparatus 11 is composed by a menu signal processing apparatus 21, a subtitle signal processing apparatus 22, an audio signal processing apparatus 23, a video signal processing apparatus 24, a multiplexer 25, a downloader 26, a file server 27, and an authoring application execution apparatus 28 which are mutually connected via a network 29. Also, a DLT (Digital Linear Tape) 31, a HDD (Hard Disk Drive) 32, and a network 33 are connected to the downloader 26 via a writer 30. It should be noted that hereinafter, the respective components of the menu signal processing apparatus 21 to the downloader 26 are also referred to as "internal apparatus".

The studio-side authoring apparatus 11 generates a multiplexed stream to be recorded on an optical disk as a file and outputs multiplexed stream to at least one of the DLT 31, the HDD 32, and the network 33. For example, in a case where the data is output to the network 33, the data is transferred to another apparatus connected to the network 33, for example, a plant-side authoring apparatus 101 of FIG. 5 which will be described below, and the data is held (stored) in the other apparatus.

In the studio-side authoring apparatus 11, the menu signal processing apparatus 21 is controlled by the authoring application execution apparatus 28, for example, to perform an encode processing on video data of a menu screen supplied by a video tape recorder or the like and store the thus obtained encode video data in the file server 27.

The subtitle signal processing apparatus 22 is controlled by the authoring application execution apparatus 28, for example, to perform the encode processing on video data of a title or the like supplied from the external video tape recorder and store the thus obtained encode video data in the file server 27.

The audio signal processing apparatus 23 is controlled by the authoring application execution apparatus 28, for example, to perform the encode processing on audio data supplied from the external video tape recorder and store the thus obtained encode audio data in the file server 27.

The video signal processing apparatus 24 is controlled by the authoring application execution apparatus 28, for example, to perform the encode processing on video data supplied from the video tape recorder and store the thus obtained encode video data in the file server 27. The video data is main data among editing targets (data) to be recorded on the optical disk. It should be noted that a detailed configuration example of the video signal processing apparatus 24 will be described below with reference to FIG. 3.

The multiplexer 25 is controlled by the authoring application execution apparatus 28 to respectively multiplex the encode audio data and the encode video data stored in the file server 27 for generating the multiplexed stream as a file (which will be hereinafter referred to as "the multiplexed stream file"). The multiplexed stream file generated by the multiplexer 25 is supplied via the network 29 to the downloader 26.

The downloader 26 outputs the multiplexed stream file via the writer 30 to at least one of the DLT 31, the HDD 32, and the network 33. The multiplexed stream file is supplied as disk image data, for example, to the plant-side authoring apparatus 101 of FIG. 5 which will be described below. It should be noted that a further description on the plant-side authoring apparatus 101 will be given below.

The file server 27 is composed, for example, of a computer having a network management function and a disk array which enables high speed accesses. The file server 27 respectively stores the encode video data and the encode audio data supplied via the network 29 from the respective internal apparatuses. Also, in response to a request from the multiplexer 25 or the like, the file server 27 outputs the stored encode video data and the stored encode audio data via the network 29 to the multiplexer 25 or the like.

The authoring application execution apparatus 28 is composed, for example, of a computer which can execute authoring application software. The authoring application software refers to software for controlling operations of the entire studio-side authoring apparatus 11. In other words, the authoring application execution apparatus 28 controls the operations of the respective internal apparatuses in the above-mentioned manner, for example, while following various conditions set by an operator.

Next, with reference to a flow chart of FIG. 2, an operation example of the studio-side authoring apparatus 11 will be described.

In step S1, while following the operation of the operator, the authoring application execution apparatus 28 notifies the respective internal apparatuses of an editing list, so that the respective internal apparatuses of the video signal processing apparatus 24 and the like are notified of editing targets.

Herein, the editing targets include at least, for example, video data which is the processing target of the video signal processing apparatus 24. Also, the editing targets refer to so-called materials (data) including an arbitral number of arbitral types of data including, as occasion demands, audio data which is the processing target of the audio signal processing apparatus 23, video data which is the processing target of the subtitle signal processing apparatus 22, and video data which is the processing target of the menu signal processing apparatus 21.

In step S2, the authoring application execution apparatus 28 generates various pieces of information used in the encode processing and notifies the internal apparatuses of an encode file in which the various pieces of information are collectively put in a predetermined file.

To be more specific, the authoring application execution apparatus 28 obtains, for example, recordable data amount of the optical disk on which the editing target is to be recorded afterwards and calculates data amounts to be assigned to the respective data pieces constituting the editing target on the basis of the data amount. Then, the authoring application execution apparatus 28 puts in the respective data amounts thus calculated in the encoding file and notifies the encoding file of the relevant internal apparatuses among the respective internal apparatuses.

For example, in a case where the video signal processing apparatus 24 is notified of the encoding file, the authoring application execution apparatus 28 notifies the video data which is the processing target of the video signal processing apparatus 24. In other words, the data amount assigned to the video data except for the menu and the title among the editing target (which will be hereinafter referred to as "assignable bit amount to the video data") is put in the encoding file and notified to the video signal processing apparatus 24.

Also, for example, regarding the video data except for the menu and the title among the editing target, the authoring application execution apparatus 28 puts time information of chapters set by the operator (which will be hereinafter referred to as "access (chapter) point") in the encoding file to be notified to the video signal processing apparatus 24. The chapter refers to a frame to which the intra-frame encode processing (the I picture) is forcedly assigned. An apparatus capable of dealing with the optical disk can check the recording content through track jump by using this chapter as a target.

In addition, for example, regarding the video data except for the menu and the title among the editing target, the authoring application execution apparatus 28 puts the maximum display frames of GOP (for example, 15 frames), an arrangement of the encode processings in the respective GOPs, and the like in the encoding file to be notified to the video signal processing apparatus 24.

Also, for example, as occasion demands, the authoring application execution apparatus 28 also puts a multi-angle processing target in the encoding file to be notified to the video signal processing apparatus 24. The multi-angle refers to such a processing that a plurality of video materials are time-division multiplexed to be recorded on the optical disk, and in accordance with a selection of a user, for example, scenes from different image pickup locations such as train running scenes can be viewed.

In addition, for example, as occasion demands, the authoring application execution apparatus 28 puts "scene change automatic detection (ON/OFF)", "disk volume of the optical disk", "start and end times of VTR", and the like in the encoding file to be notified to the video signal processing apparatus 24.

In step S3, on the basis of various pieces of information included in this encoding file, the respective internal apparatuses encodes the relevant data among the editing target and stores each of the thus obtained encode data in the file server 27. To be more specific, for example, the video signal processing apparatus 24 executes a "video data generation processing" of FIG. 4 which will be described below.

In step S4, the multiplexer 25 multiplexes each of the encode data stored in the processing in step S3 in the file server 27 to generate a multiplexed stream file and supplies the multiplexed stream file to the downloader 26.

In step S5, the downloader 26 outputs the multiplexed stream file via the writer 30 to at least one of the DLT 31, the HDD 32, and the network 33. With this configuration, the processing of the studio-side authoring apparatus 11 is ended.

Next, with reference to FIG. 3, a detailed configuration example of the video signal processing apparatus 24 among the studio-side authoring apparatus 11 will be described.

Figure 3:
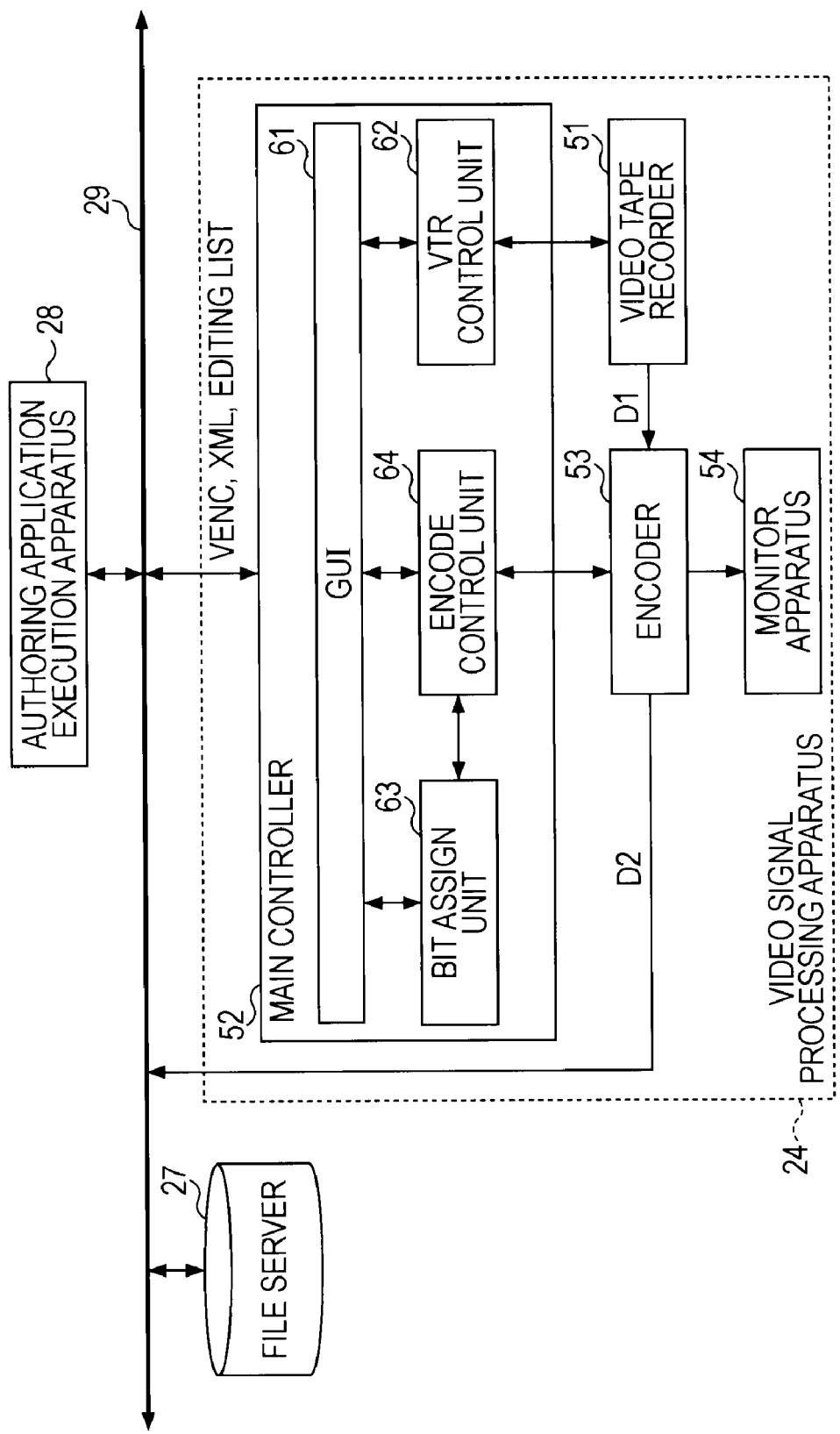
FIG. 3 is a block diagram of a configuration example of a video signal processing apparatus in the studio-side authoring apparatus.

As shown in FIG. 3, the video signal processing apparatus 24 is composed, for example, of a video tape recorder 51, a main controller 52, an encoder 53, and a monitor apparatus 54.

Through the above-mentioned processing in step S1, the editing list is supplied from the authoring application execution apparatus 28 to the video signal processing apparatus 24. To be more specific, as shown in FIG. 3, the editing list is supplied to the main controller 52, and thereafter supplied to the video tape recorder 51. In other words, the editing list is supplied via the main controller 52 to the video tape recorder 51.

While following this editing list, the video tape recorder 51 reproduces a magnetic tape. As a result, the video tape recorder outputs video data D1 of the processing target and supplies the video data D1 to the encoder 53.

The encoder 53 switched the operations while following the various encode conditions set by the main controller 52, and performs the encode processing based on the MPEG standard, for example, on the video data D1 output from the video tape recorder 51. At this time, the setting of the various encode conditions are variably controlled by the main controller 52, so that the bit amount generated from the encoder 53 is controlled.

Furthermore, the encoder 53 notifies the main controller 52 of this result of the encode processing. With this configuration, the main controller 52 can detect the picture type used in the encode processing of the encoder 53 and the generated bit amount in the encode processing in units of the frame.

In addition, in a case where the so-called two-path encode is carried out, the encoder 53 executes both the encode processings for the first path and the second path.

Figure 4:
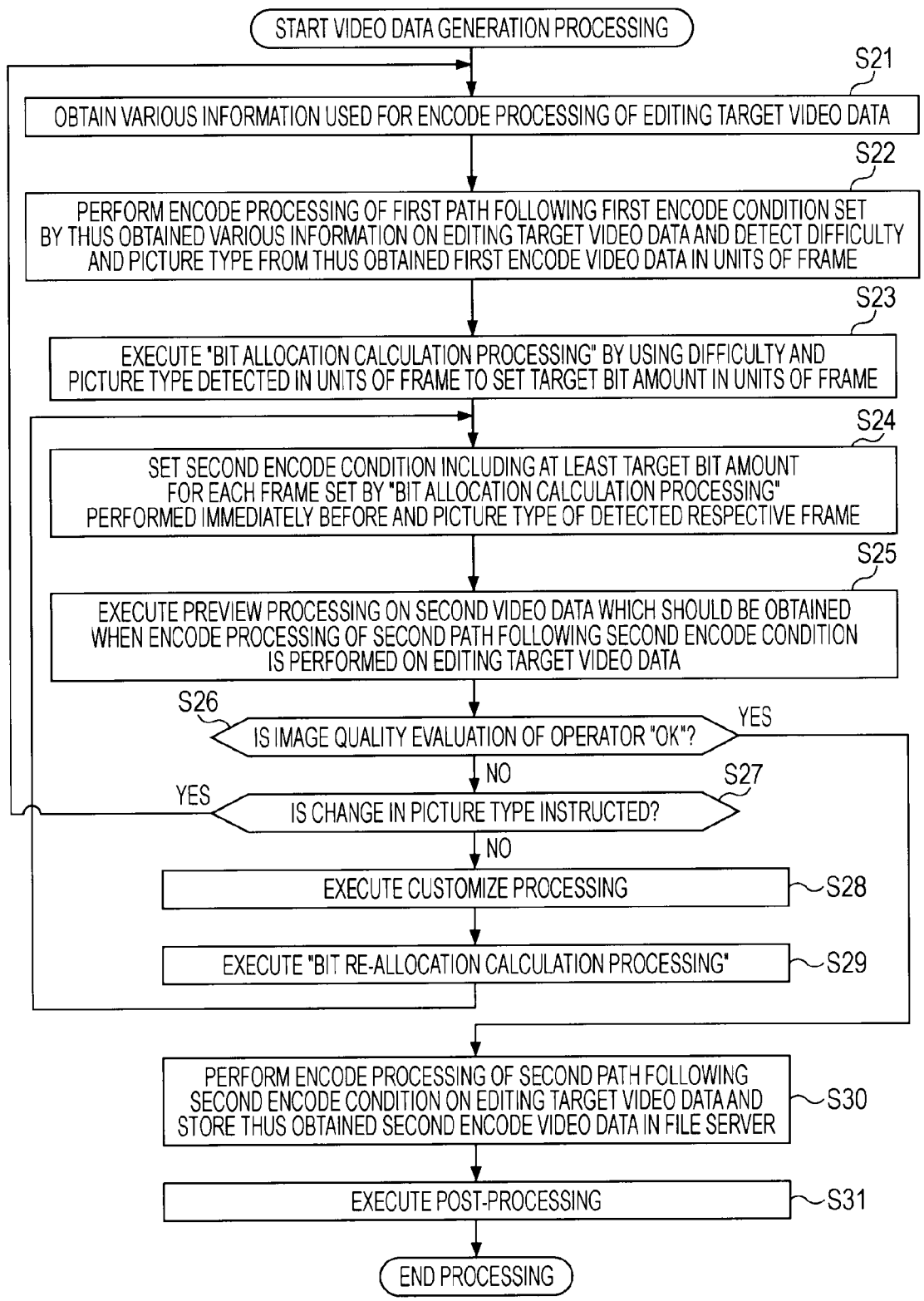
FIG. 4 is a flow chart for describing an example of a "video data generation processing" executed by the video signal processing apparatus.

To be more specific, in order to set the encode conditions utilized in the encode processing for the second path in advance, the encode processing for the first path, for example, the encoder 53 execute an encode processing which is a part of a processing in step S22 of FIG. 4 described below. In more detail, the encoder 53 assigns the picture type in its own internal processing of. Then, the encoder 53 utilizes the thus assigned picture type to perform the encode processing for the first path on the video data D1. As a result of the encode processing for the first path, for example, the encoder 53 notifies the main controller 52 of the picture type, the generated bit amount, and the like in the respective frames.

In the encode processing for the second path, the encoder 53 executes, for example, an encode processing in step S30 of FIG. 4 which will be described below. In other words, the encoder 53 utilizes the picture type and the target bit amount in units of the frame set by the main controller 52 to perform the encode processing for the second path on the video data D1 and store the thus obtained encode video data D2 via the network 29 in the file server 27. At this time, the encoder 53 notifies the main controller 52 of the data amount of the video data D2 stored in the file server 27, and the like.

The monitor apparatus 54 is composed, for example, of a display apparatus or the like. On the basis of a control via the encoder 53 of the main controller 52, the monitor apparatus 54 displays a video corresponding to the encode video data D2 output from the encoder 53. In other words, the encoder 53 decodes the encode video data D2 and supplies the thus obtained video signal to the monitor apparatus 54. The monitor apparatus 54 displays a video corresponding to the supplied video signals, that is, the encode video data D2.

With this configuration, the operator can check the processing result of the encoder 53 by using the monitor apparatus 54 as occasion demands. In other words, the video signal processing apparatus 24 utilizes the monitor apparatus 54 so that it is possible to perform a preview of the processing result of the encoder 53. Furthermore, as the result of this preview, the operator operates the main controller 52, and it is thus possible to finely change each of the various encode conditions.

The main controller 52 is composed, for example, of a computer assigned to the video signal processing apparatus 24. As data communication is performed with the authoring application execution apparatus 28 via the network 29, the main controller 52 controls the operations of the entire video signal processing apparatus 24.

For this reason, the main controller 52 is composed, for example, as shown in FIG. 3, of a graphical user interface (GUI) 61, a video tape recorder (VTR) control unit 62, a bit assign unit 63, and an encode control unit 64.

That is, the main controller 52 receives both the control from the authoring application execution apparatus 28 and the operations performed by the operator on the basis of the management of the GUI 61. Also, by using the VTR control unit 62, the bit assign unit 63, and the encode control unit 64 managed by GUI 61, the respective operations of the video tape recorder 51, the encoder 53, and the monitor apparatus 54 are controlled.

With this configuration, for example, on the basis of the encoding file notified from the authoring application execution apparatus 28, the main controller 52 can set various encode conditions. It should be noted that hereinafter, in order to distinguish from an encoding file supplied to another internal apparatus, the encoding file supplied to the video signal processing apparatus 24 which will be referred to as encoding file VENC.XML in conformity to the description in FIG. 3.

Furthermore, the main controller 52 receives the setting of the operator via the GUI 61 as described above. With this configuration, for example, it is possible to update the setting of the various encode conditions.

Then, the main controller 52 carries out such a control, for example, that the encoder 53 performs the encode processing which follows the various encode conditions set or updated in this manner on the video data D1 of the processing target.

In addition, the main controller 52 receives the result of the encode processing notified from the encoder 53, and thus, the result of the encode processing can be notified to the authoring application execution apparatus 28.

As the VTR control unit 62 controls the operation of the video tape recorder 51 while following the editing list notified from the authoring application execution apparatus 28, and the video data D1 of the editing target is reproduced from the video tape recorder 51.

The bit assign unit 63 set various encode conditions while following, for example, the encoding file VENC.XML notified from the authoring application execution apparatus 28 and notifies the encode control unit 64 of the control data corresponding to this encode condition. At this time, the bit assign unit 63 can change the setting of the various encode conditions, for example, in accordance with the operation of the GUI 61 performed by the operator.

The encode conditions set by the bit assign unit 63 correspond, for example, to the first encode conditions utilized in the encode processing for the first path and the second encode conditions utilized in the encode processing for the second path. Among the first encode conditions, for example, various conditions and the like used for setting the picture type by the encoder 53 in the internal processing for executing the encode processing for the first path are included. On the other hand, among the second encode conditions, for example, the picture type, the target bit amount, and the like in each of the frames utilized in the encode processing for the second path are included.

The encode control unit 64 controls the encode processings for the first path and the second path of the encoder 53 while following, for example, the control file notified from the bit assign unit 63.

In addition, from the result of the encode processing for the first path performed by the encoder 53, the encode control unit 64 detects both the difficulty caused during the encode processing and the picture type in units of the frame and notifies the bit assign unit 63 of the detection result. After that, the bit assign unit 63 uses the notified difficulty and the picture type in units of the frame to set the second encode conditions utilized in the encode processing for the second path. It should be noted that the difficulty will be described below.

Furthermore, the encode control unit 64 carries out such a control that the encode video data D2 obtained from the final result of the encode processing for the second path of the encoder 53 is stored via the network 29 in the file server 27.

Next, with reference to a flow chart of FIG. 4, an operation example of a video data generation processing in the video signal processing apparatus 24 will be described.

Figure 2:
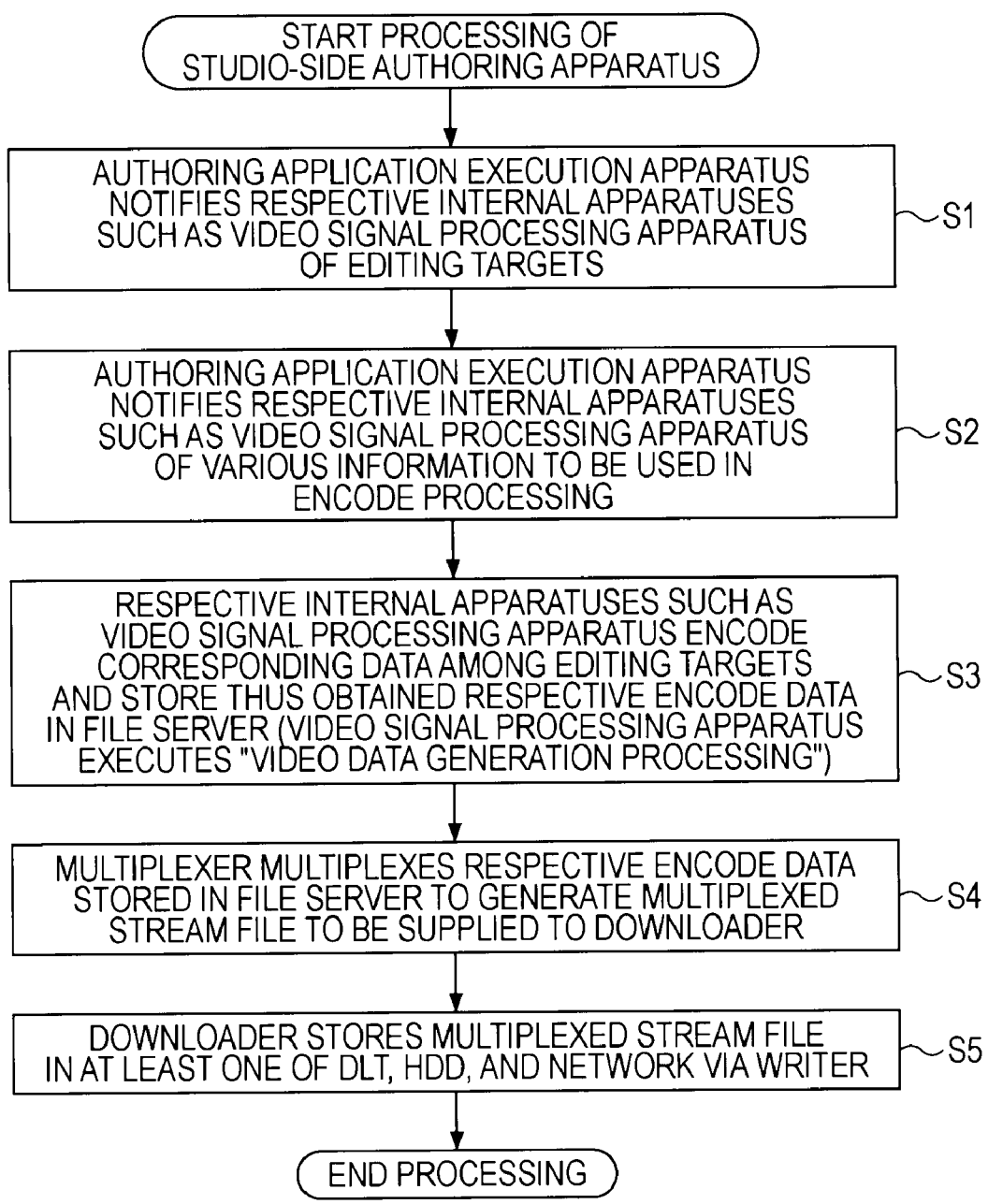
FIG. 2 is a flow chart for describing a processing example of the studio-side authoring apparatus.

From the authoring application execution apparatus 28, the editing list (editing target) is notified in the above-mentioned processing in step S1 of FIG. 2, and in a processing in step S2, the encoding file VENC.XML is supplied. Furthermore, when the start of this "video data generation processing" is instructed, on the basis of the management of the GUI 61, the VTR control unit 62, the bit assign unit 63, and the encode control unit 64 are activated to start this "video data generation processing". In other words, the processing advances to a processing in step S3 of FIG. 2, and as a processing of the video signal processing apparatus 24 among the processing in step S3, this "video data generation processing" is started.

In step S21, the main controller 52 obtains various information used in the encode processing of the video data D1 of the editing target on the basis of the encoding file VENC.XML supplied from the authoring application execution apparatus 28.

To be more specific, for example, various pieces of information including the "access (chapter) point", the "scene change automatic detection (ON/OFF)", the "disk volume", the "start and end times of VTR", the "assignable bit amount to the video data D1", and the like included in the encoding file VENC.XML are obtained.

In step S22, the main controller 52 controls the video tape recorder 51 and the encoder 53 to perform the encode processing for the first path which follows the first encode conditions set by the various pieces of information obtained in the processing in step S21 on the video data D1 of the editing target. Then, the main controller 52 detects both the difficulty caused during the encode processing and the picture type in units of the frame from the first encode video data obtained from the result of the encode processing for the first path.

To be more specific, the encoder 53 processes the video data D1 of the editing target reproduced by the video tape recorder 51 in the following manner.

The encoder 53 sets the picture type in each of the frames constituting the video data D1. In other words, the encoder 53 sets the frame specified on the basis of the instruction from the main controller 52 as the I picture. Furthermore, in a case where the "scene change automatic detection" obtained in the processing in step S21 is set as ON (in a case where that effect is notified from the main controller 52), the encoder 53 forcedly sets the frame determined as the scene change from the correlation between the previous and next frames as the I picture. Then, the encoder 53 executes the processing of setting the frame group from the frame set as the I picture to the frame immediately before the next I picture frame as the GOP.

In addition, the encoder 53 uses the picture type set in this manner to sequentially perform the encode processing for the first path based on fixed quantization steps on each of the frames constituting the video data D1. Then, the encoder 53 notifies the main controller 52 of the bit amount generation at that time, that is, the generated bit amount in each of the frames when encoded, and also notifies the main controller 52 of the picture type in the respective frames.

After that, from this notification from the encoder 53, the main controller 52 detects both the difficulty and the picture type in units of the frame. In other words, the main controller 52 detects the picture type in the respective frames notified from the encoder 53 as the picture type each of the frames as it is. Also, the main controller 52 detects (measures) the generated bit amount in each of the frames notified from the encoder 53 as the difficulty in each of the frames.

In this manner, the difficulty meant in this specification refers to the data amount in each of the frames after the encode processing when the encode processing based on fixed quantization steps is performed on the video data D1 of the editing target.

That is, in the encode processing between the frames (the encode type of the P or B picture), a predictive error (difference) from the predictive frame is large at a part where the motion is drastic, and at that rate, much data is used for suppressing the degradation in the image quality. Also, in the intra-frame encode processing (the encode type of the I picture), in a case where a large number of high frequency components exist, higher order coefficient data is generated through a discrete cosine conversion processing. Thus, at that rate, the large amount of data is used for suppressing the degradation in the image quality. Therefore, in a case where the encode processing based on fixed quantization steps is performed on the video data D1, in the part (frame) where the large amount of data is used for suppressing the degradation in the image quality, the large amount of data is detected. From the above, the data amount of the data in each of the frames constituting the encode video data obtained as the result of performing the encode processing based on fixed quantization steps on the video data D1 of the editing target refers to the difficulty in each of the frames.

In step S23, the main controller 52 uses the difficulty and the picture type detected in the processing in step S22 in unit of the frame to execute the "bit allocation calculation processing", thus setting the target bit amount in unit of the frame.

The "bit allocation calculation processing" refers, for example, to the following processing. In other words, a calculation processing of assigning the target bit amount of the entire encode video data D2 obtained when the encode processing for the second path is performed on the video data D1 of the editing target by using the difficulty and the picture type detected in the processing in step S22 to each frame is the "bit allocation calculation processing".

Hereinafter, the "bit allocation calculation processing" will be described in more detail.

That is, the main controller 52 executes the computation processing of the following expression (1) to calculate the actually assignable total bit amount TOTAL_SUPPLY with respect to the video data D1 (the encode data D2).

$$TOTAL\_SUPPLY=TOTAL\_BYTES-TOTAL\_HEADER \quad (1)$$

In the expression (1), TOTAL_BYTES represents the "assignable bit amount to the video data D1" obtained in the processing in step S21, which is equivalent to the target data amount of the entire encode video data D2 recorded in the file server 27 on the network 29. Also, TOTAL_HEADER represents the data amount of addition data such as a header among the encode video data D2, which is identified by the total number of GOPs.

Therefore, through the computation processing of the expression (1), the main controller 52 calculates the data amount that can be assigned to the data except for the additional date among the encode video data D2 as the actually assignable total bit amount TOTAL_SUPPLY with respect to the video data D1.

Next, with respect to the video data D1, the main controller 52 allocates the actually assignable total bit amount TOTAL_SUPPLY to each of the encode processing unit (encode unit). It should be noted that hereinafter, the data amount of each of the encode units distributed in this manner is referred to as the target bit amount of the corresponding encode unit and also described as SUPPLY_BYTES. In addition, for each of the encode units, the main controller 52 computes a total sum of the difficulties (the difficulties detected in the processing in the processing in step S22) of each of the frames corresponding to the encode unit. It should be noted that hereinafter, the difficulty of each of the frames is described as DIF. In addition, the total sum of the difficulties DIFs is described as DIF_SUM.

Subsequently, for each of the encode units, the main controller 52 calculates an evaluation function for performing the bit allocation in units of the GOP. The evaluation function herein is represented, for example, by the following expression (2).

$$Y=BX \quad (2)$$

In the expression (2), Y represents the target bit amount SUPPLY_BYTES of the computation target encode unit, and X represents the total sum DIF_SUM of the difficulties DIFs of the respective frames belonging to the computation target encode unit.

When the evaluation function of the expression (2) is set in this manner, in other words, when a coefficient B in the evaluation function of the expression (2) is computed, for each of the encode units, the main controller 52 sequentially executes the computation processing of the following expression (3) using the coefficient B.

$$GOP\_TGT=B\times GOP\_DIF\_SUM \quad (3)$$

It should be noted that in the expression (3), GOP_DIF_SUM represents the total sum of the difficulties DIFs of the respective frames belonging to the computation target GOP. Also, GOP_TGT represents a target bit amount of the GOP to be subjected to the computation.

That is, the target bit amount GOP_TGT of the GOP to be subjected to the computation refers to the data amount allocated to the computation target GOP in accordance with the difficulty GOP_DIF_SUM of the computation target GOP among the target bit amount SUPPLY_BYTES of the encode unit including the computation target GOP.

Then, the main controller 52 performs the processing of allocating the target bit amount GOP_TGT of the GOP to be subjected to the computation to each of the frames belonging to the target GOP for the respective GOPs, thus setting the target bit amount of the respective frames.

In this manner, in the "bit allocation calculation processing" in step S23, while the result of the encode processing for the first path (the processing result in step S22) is used as a reference, one of the second encode conditions utilized in the encode processing for the second path, that is, the target bit amount is set.

In step S24, the main controller 52 sets the second encode conditions at least including the target bit amount for each frame set by the "bit allocation calculation processing" (in the current case, the "bit allocation calculation processing" in step S23) performed immediately before and the picture type for each frame detected in the processing in step S22 performed immediately before.

Next, in step S25, the main controller 52 executes the preview processing of the second encode video data D2 that should be obtained in a case where the encode processing for the second path which follows the second encode conditions is performed on the video data D1 of the editing target.

The preview processing in step S25 refers, for example, to a series of the following processings. In other words, in response to the operation of the GUI 61 performed by the operator, that is, in response to the control of the main controller 52, the video tape recorder 51 reproduces the video data D1 of the editing target and supplies the video data to the encoder 53. While following the second encode conditions, the encoder 53 once encodes the video data D1 and decodes the thus obtained encode video data D2 again, so that the thus obtained video signal is supplied to the monitor apparatus 54. The monitor apparatus 54 displays a video corresponding to this video signal. In other words, the video corresponding to the second encode video data D2 that should be obtained in a case where the encode processing for the second path which follows the second encode conditions is performed on the video data D of the editing target is displayed on the monitor apparatus 54 as the preview video. The above-mentioned series of the processings is the preview processing in step S25.

In step S26, the main controller 52 determines whether or not the image quality evaluation performed by the operator is "O.K".

To elaborate, the operator performs the image quality evaluation on the preview video displayed on the monitor apparatus 54 through the processing in step S25, that is, the image quality of the video corresponding to the encode video data D2. By operating the GUI 61, the operator can input the evaluation result to the main controller 52.

For example, when the operator is satisfied with the image quality and operates the GUI 61 to instruct the start of the encode processing for the second path, in step S26, the image quality evaluation performed by the operator is determined as "O.K", and the processing advances to step S30.

In step S30, the main controller 52 controls the video tape recorder 51 and the encoder 53 to perform the encode processing for the second path which follows the second encode conditions on the video data D1 set in the processing in step S24 performed immediately before, on the editing target. Also, the main controller 52 stores the thus obtained second encode video data D2 in the file server 27.

To be more specific, for example, on the basis of the control of the main controller 52, the video tape recorder 51 reproduces the video data D1 of the editing target and supplies the video data to the encoder 53. The encoder 53 performs the encode processing for the second path which follows the second encode conditions instructed from the main controller 52 on the video data D1 and stores the thus obtained second encode video data D2 via the network 29 in the file server 27 on the basis of the control of the main controller 52.

After that, in step S31, the main controller 52 performs the post-processing of notifying the authoring application execution apparatus 28 of the result of the encode processing for the second path, and the like. With this configuration, the "video data generation processing" is ended.

Meanwhile, the operator performs the evaluation as to whether or not the image quality of the preview video displayed on the monitor apparatus 54 through the preview processing in step S25, that is, the image quality of the video corresponding to the encode video data D2 before being stored in the file server 27 is satisfied. When the operator is not satisfied with the image quality and, for example, operates the GUI 61 to select a customized processing. In step S26, the image quality evaluation performed by the operator is determined as "O.K", and the processing advances to step S27.

In step S27, the main controller 52 determines whether or not the change in the picture type is instructed.

That is, by operating the GUI 61, the operator can input to the main controller 52, an instruction of changing the picture type in at least one frame among the respective frames constituting the video data D1 of the editing target from the B or P picture to the I picture. In a case where such an operation is not issued from the operator, in step S27, it is determined that the change in the picture type is not instructed, and the processing advances to step S28.

In step S28, the main controller 52 executes the "customized processing". The "customized processing" herein refers, for example, to a processing of partially changing the image quality by changing the encode conditions in response to the operation of the GUI 61 performed by the operator.

Furthermore, in the subsequent step S29, by executing the "bit allocation calculation processing" again similar to the above-mentioned step S23, the main controller 52 updates the setting of the target bit amount. In other words, the processing in step S29 is basically similar to the processing in the above-mentioned step S23. It should be noted that in the processing in step S29, a point of utilizing the result of the "customized processing" in step S28 performed immediately before is different from the processing in step S23.

When this processing in step S29 is ended, the process is returned to step S24, and the processing in the subsequent steps is repeatedly performed.

On the other hand, in a case where the instruction of the change in the picture type is issued from the operator, in step S27, it is determined that the change in the picture type is instructed, and the process is returned to step S21. Then, the processing in the subsequent steps is repeatedly performed.

That is, the frame in which the change in the picture type is instructed by the operator is regarded as the scene change point, and as a result, the series of processings after the processing of obtaining various pieces of information in the above-mentioned step S21 is freshly performed again.

As described above, the video signal processing apparatus 24 can set the second encode conditions utilized in the encode processing for the second path while the difficulty and the picture type for each frame are used as the reference. Furthermore, in response to the operation performed by the operator, the video signal processing apparatus 24 can change this second encode condition. With this configuration, the video data D1 is encoded in the second encode condition eventually satisfied by the operator, and the thus obtained encode video data D2 is stored in the file server 27.

Furthermore, the set difficulty and the set picture type which are used as the reference for the second encode conditions are the results of the encode processing for the first path. The picture type utilized for the respective encode processings for the first path and the second path is the same across all the frames. In other words, it can be mentioned that the condition "the picture type utilized (set) in the encode processing for the first path is also utilized in the encode processing for the second path as it is" is included in this second condition. With this configuration, it is possible to create the encode video data D2 so that the volume prepared in the recording media is efficiently used up.

After that, as described above, in the studio-side authoring apparatus 11 of FIG. 1, the encode video data D2 and the other encode video data and encode audio data are multiplexed one another, and the thus obtained multiplexed stream file is output to at least one of the DLT 31, the HDD 32, and the network 33.

Then, as described above, the multiplexed stream file output to at least one of the DLT 31, the HDD 32, and the network 33 is supplied as the disk image data, for example, to an authoring apparatus installed on a plant side of FIG. 5 (which will be hereinafter referred to as plant-side authoring apparatus).

Figure 5:
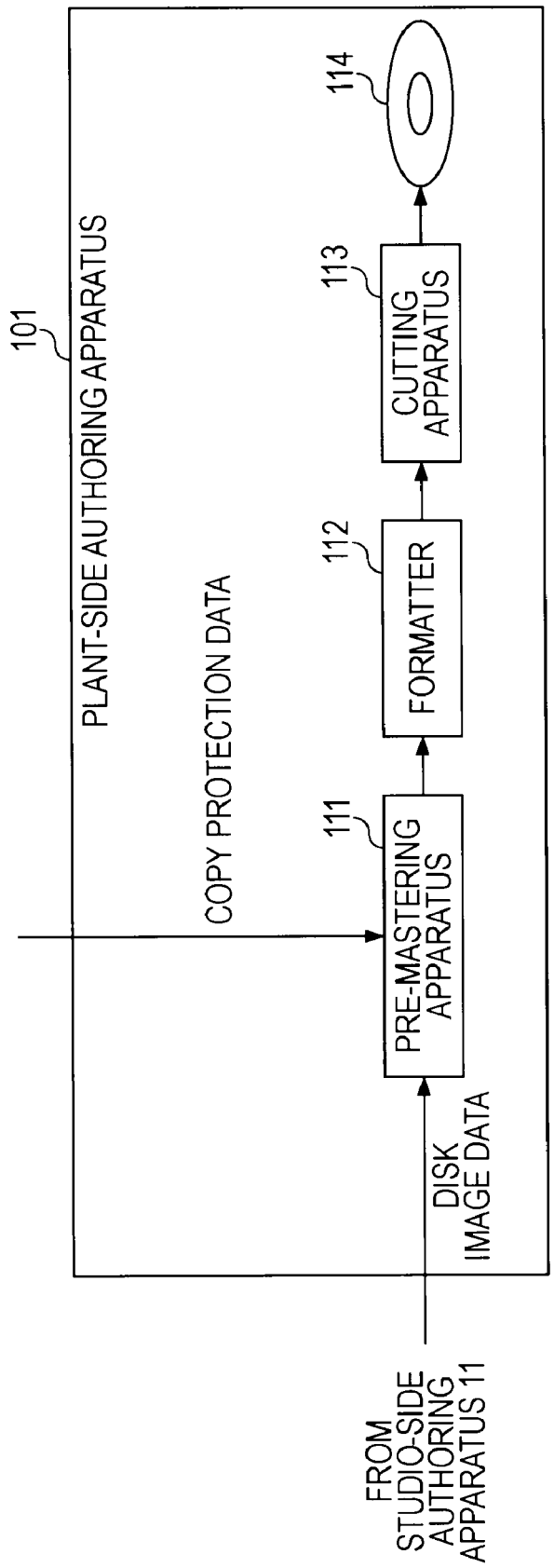
FIG. 5 is a block diagram of a configuration example of a plant-side authoring apparatus.

FIG. 5 illustrates a configuration example of the plant-side authoring apparatus to which an embodiment of the present invention is applied.

As illustrated in FIG. 5, the plant-side authoring apparatus 101 is composed, for example, of a pre-mastering apparatus 111, a formatter 112, and a cutting apparatus 113.

Figure 6:
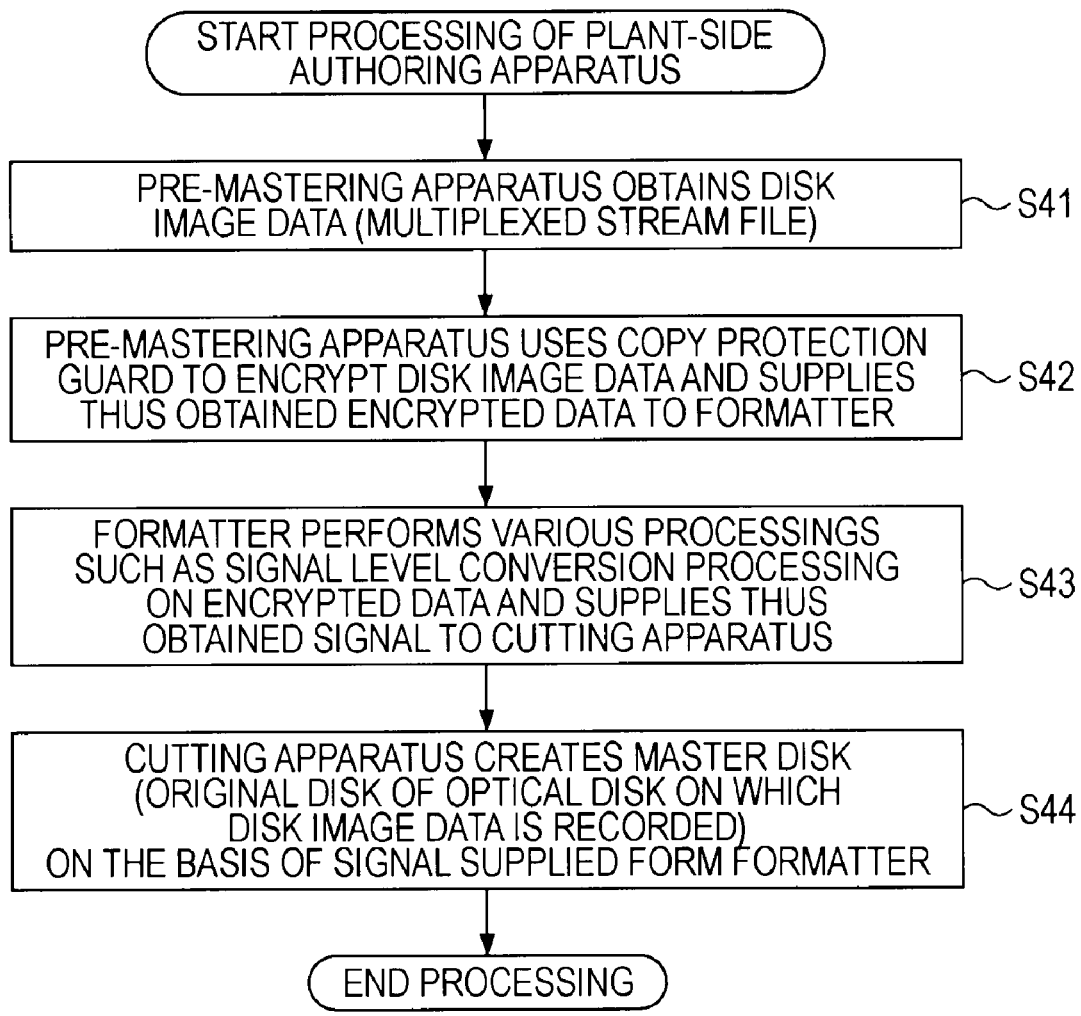
FIG. 6 is a flow chart for describing a processing example of the plant-side authoring apparatus.

Herein, with reference to a flow chart of FIG. 6, a processing example of the plant-side authoring apparatus 101 will be described.

In step S41, the pre-mastering apparatus 111 obtains the disk image data (the multiplexed stream file including the encode video data D2 of FIG. 3).

Next, in step S42, the pre-mastering apparatus 111 uses copy protection data provided from the outside to encrypt the disk image data and supplies the thus obtained encrypted data to the formatter 112.

In step S43, the formatter 112 performs various processings such as a signal level conversion processing on the encrypted data and supplies the thus obtained signal to the cutting apparatus 113.

In step S44, the cutting apparatus 113 creates a master disk 114 (an original disk 114 of an optical disk on which the disk image data is recorded) on the basis of the signal supplied from the formatter 112. With this configuration, the processing of the plant-side authoring apparatus 101 is ended.

As described above, in the encode processing for the first path performed on the video data D1 of FIG. 3, the picture type optimal for the video material is set and utilized, and the setting of the target bit amount for the respective frames is performed by using the picture type as the reference. After that, the picture type that is the same as that for the first path is utilized, and also the target bit amount set for the first path is utilized. The encode processing for the second path is performed on the video data D1. As a result, the encode video data D2 is obtained. Then, the disk image data including the encode video data D2 is supplied to the plant-side authoring apparatus 101 and recorded on the optical disk 114.

Therefore, the usable disk volume for the optical disk 114 is previously notified to the studio-side authoring apparatus 11 of FIG. 1, so that the video signal processing apparatus 24 of FIG. 3 can set the target bit amount in conformity to the notification. As a result, the data amount of the disk image data recorded on the optical disk 114 is prevented from being short or too much as compared with the usable disk volume for the optical disk 114. With this configuration, it is possible to use up the disk volume of the optical disk 114 to a maximum extent. As a result, the image quality of the video data recorded on the optical disk 114 is improved.

Incidentally, the above-mentioned series of processings can be executed by using hardware but also can be executed by using software.

In this case, an entirety or a part of the studio-side authoring apparatus 11 of FIG. 1 can be composed as a computer, for example, which will be described below. It should be noted that the part of the studio-side authoring apparatus 11 may be, for example, the entire video signal processing apparatus 24 of FIG. 1 or furthermore, a part of the video signal processing apparatus 24, for example, the main controller 52 or the like of FIG. 3 in some cases.

Similarly, an entirety or a part of the plant-side authoring apparatus 101 of FIG. 5 can be composed as a computer, for example, which will be described below. It should be noted that the part of the plant-side authoring apparatus 101 may be, similarly to the studio-side authoring apparatus 11, for example, the entire cutting apparatus 113 or furthermore, a part of the cutting apparatus 113 which is not shown in the drawing in some cases.

Encode Parallel Processing

Next, an information processing system in which the encode parallel processing for video data is performed will be described. The information processing system represented as a specific example is aimed to improve the efficiency of the encode processing while a plurality of computers perform the encode processing in parallel. It should be noted that the information processing system corresponds to the above-mentioned encode control unit 64 and the encoder 53 of the video signal processing apparatus 24.

Figure 7:
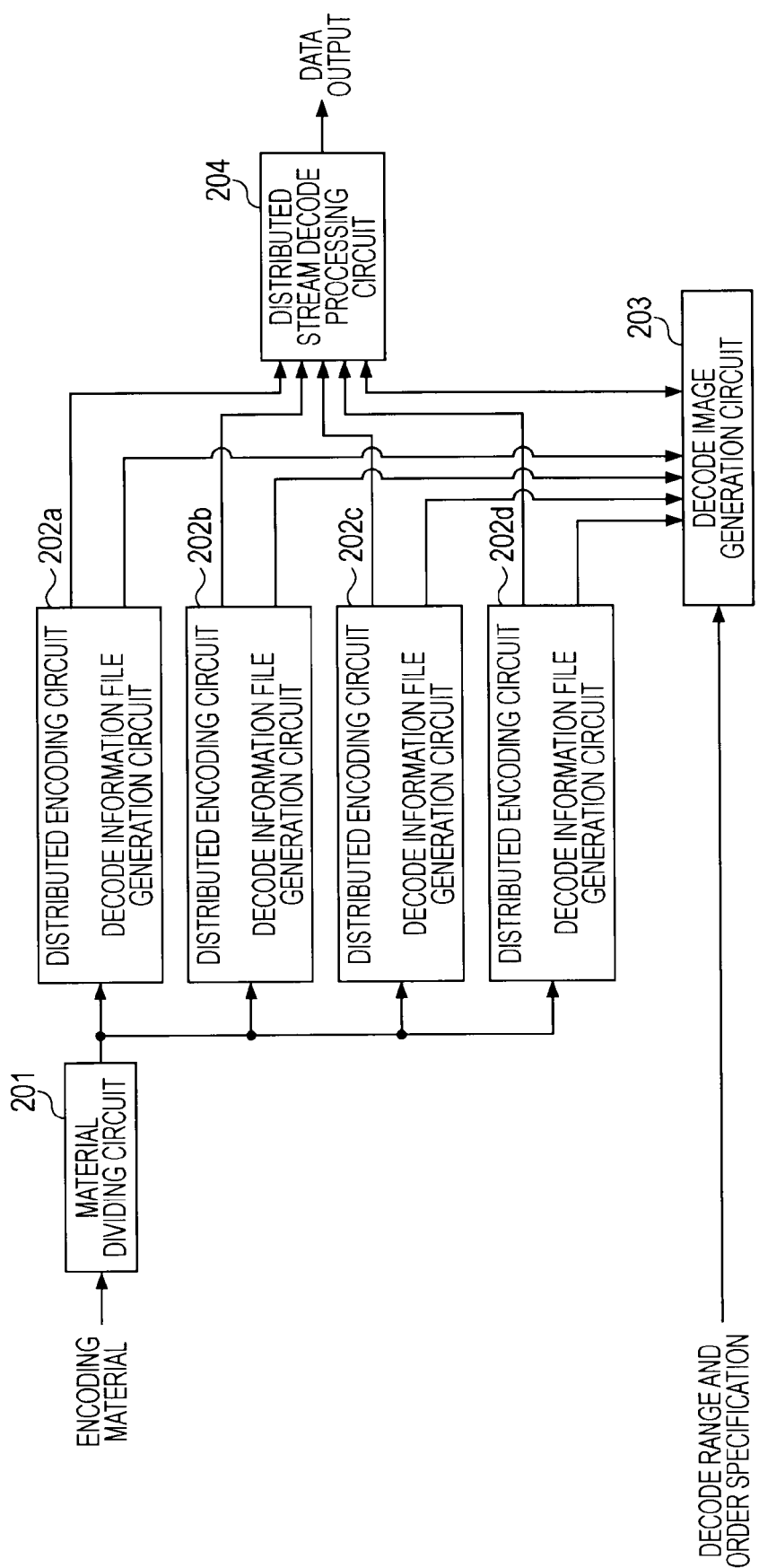
FIG. 7 is a block diagram of a configuration example of an information processing system for performing a parallel processing on encodes.

FIG. 7 is a block diagram of a configuration example of the information processing system in which the encode parallel processing is performed. The information processing system is provided with a material dividing circuit 201, distributed encoding circuits 202a to 202d having a distributed encode processing circuit and a decode information file generation circuit, a decode image generation circuit 203, and a distributed stream decode processing circuit 204.

The material dividing circuit 201 determines whether or not the data of the encoding target material is subjected to the distributed encode processing. In a case where the distributed encode processing is performed, the data is divided into division data, and this division data is output to the respective distributed encoding circuits 202a to 202d. It should be noted that the data of the encoding target material may be divided in accordance with processing performances of the distributed encoding circuits 202a to 202d or may be evenly divided.

The distributed encoding circuits 202a to 202d include the distributed encode processing circuit and the decode information file generation circuit.

The distributed encode processing circuit encodes the division data into the division encoding data (the distributed stream) and outputs this distributed stream to the distributed stream decode processing circuit 204. To be more specific, for example, as described above, through the two-path encode, the target bit amount set for the first path is utilized, and the encode processing for the second path is performed on the division data. As a result, the distributed stream can be obtained.

The decode information file generation circuit generates a decode information file of the distributed stream. The decode information file includes, for example, information such as a start time code, an end time code, a distributed stream duration, a resolution, a frame rate, and a picture type in the encoding target material where the distributed stream is located. Therefore, when a reference is made to the decode information file, it is possible to find out that the distributed stream is located at which position of the encoding target material.

The distributed encoding circuits 202a to 202d encode the division data into the division encoding data. Also, the distributed encoding circuits 202a to 202d can be respectively composed of a computer adapted to execute a program for generating the decode information file including the time information.

Figure 8:
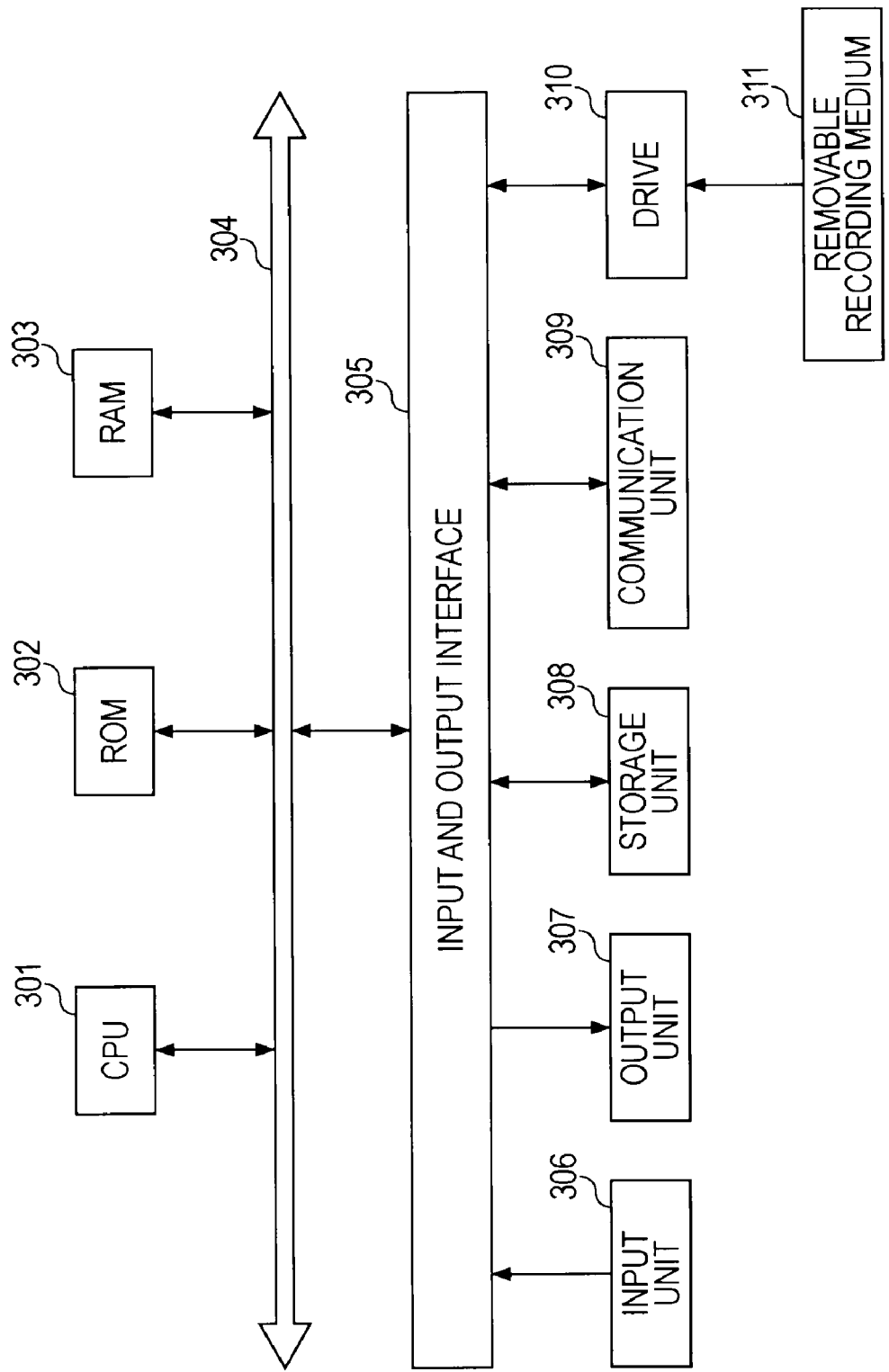
FIG. 8 is a block diagram of a configuration example of a computer.

FIG. 8 is a block diagram of a configuration example of the computer. A CPU (Central Processing Unit) 301 executes various processings while following a program recorded on a ROM (Read Only Memory) 302 or a program loaded from a storage unit 308 onto a RAM (Random Access Memory) 303. The RAM 303 appropriately stores data used for the CPU 301 to execute various processings.

The CPU 301, the ROM 302, and the RAM 303 are mutually connected via a bus 304. An input and output interface 305 is also connected to the bus 304.

An input unit 306, an output unit 307, the storage unit 308, and a communication unit 309 are connected to the input and output interface 305. Also, a drive 310 is connected to the input and output interface 305 as occasion demands. A removable recording medium 311 composed of a magnetic disk, an optical disk, an opto-magnetic disk, or a semiconductor memory is appropriately mounted to the input and output interface 305. The computer program read from the recording medium is installed into the storage unit 308 as occasion demands.

The input unit 306 is composed, for example, of an input device such as a remote controller including a touch panel doubling as a display unit of the output unit 307, a key board, and a light receiving unit, or a mouse.

The output unit 307 is composed, for example, of a single display unit such as a display, a single audio output unit such as a speaker or a head phone output terminal, or a combination thereof.

The storage unit 308 is composed, for example, of hard disk, or the like. Also, the communication unit 309 is composed, for example, of a modem, a terminal adapter, a wireless communication device, or the like. The communication unit 309 performs a communication with another information processing apparatus.

In a case where the distributed encoding circuits 202a to 202d are constructed by using the above-mentioned computer, the distributed encoding circuits 202a to 202d cam be constructed by using the programs executed by the input unit 306, the output unit 307, and the CPU 301 in combination.

As the decode range, the order, and the like specified by the operator, the decode image generation circuit 203 generates the decode image data in the stream in a predetermined range on the basis of this specification information from the decode information file. Also, the decode image generation circuit 203 creates decode image data from a predetermined position on the basis of the picture type information as will be described below. Also, a storage unit may store the decode information file generated by the decode information file generation circuit.

This decode image data includes, for example, information to be associated with the decode information file of the distributed stream. Also, similarly to the distributed stream, the decode image data includes information such as the start time code, the end time code, the stream duration, the resolution, the frame rate, and the picture type.

The distributed stream decode processing circuit 204 decodes the distributed stream on the basis of the decode image data generated in the decode image generation circuit 203 and output the decode data. Also, a storage unit may be provided for storing the distributed stream generated in the distributed encode processing circuit.

By generating the decode image data in the above-mentioned manner through the instruction from the operator, it is possible to perform the decode operations on the distributed stream such as the reproduction, the reverse reproduction, the frame advance, and the jump, and the operations such as the image quality check and the title creation can be efficiently performed.

Figure 9:
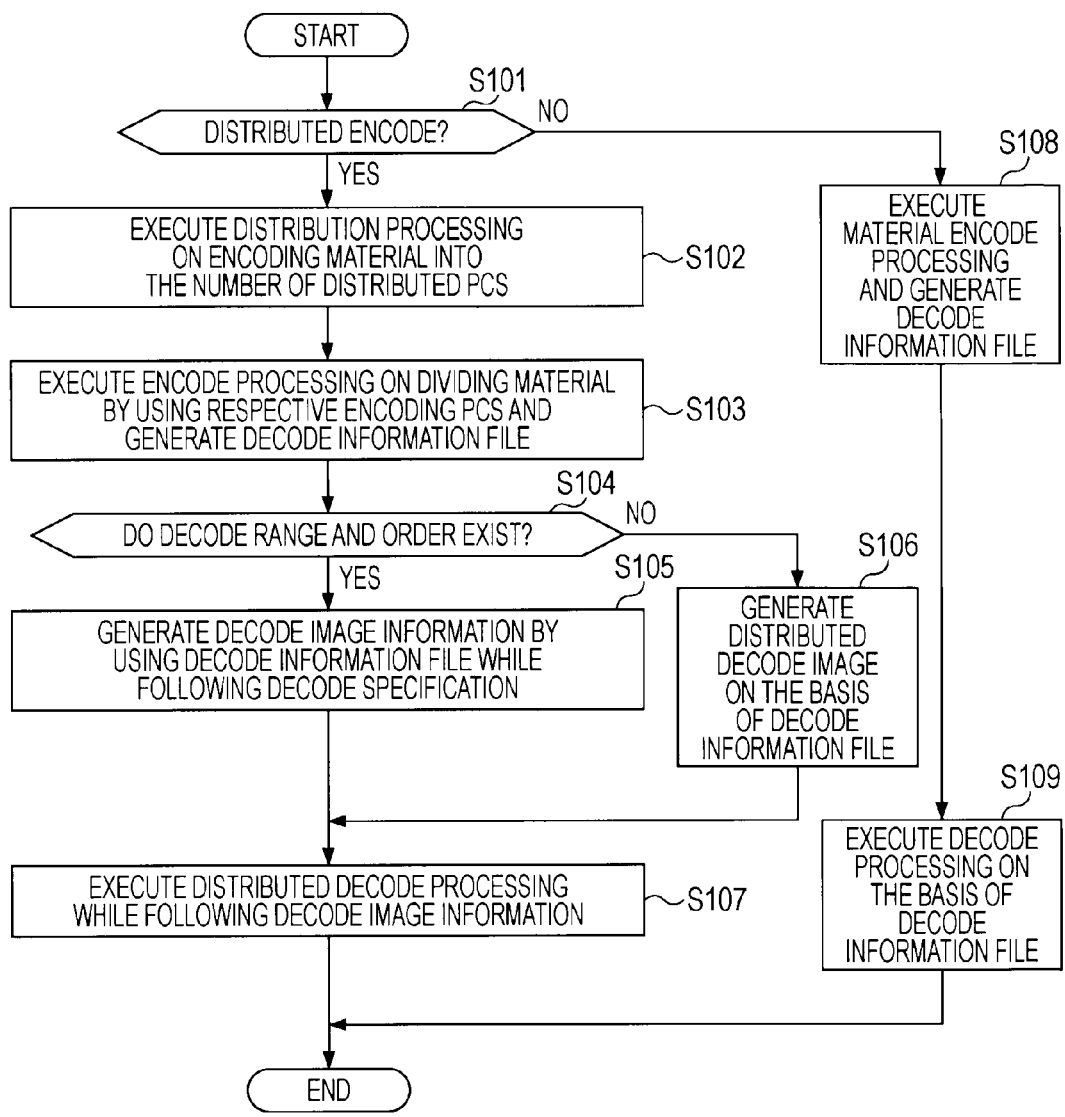
FIG. 9 is a flow chart for describing an operation example of a distributed encode processing.

Next, with reference to a flow chart shown in FIG. 9, the decode processing for the distributed streams will be described.

In step S101, the material dividing circuit 201 determines whether or not the data of the encoding target material is subjected to the distributed encode processing. To be more specific, for example, the material dividing circuit 201 determines whether or not the distributed encode processing is performed on the basis of the codec specified by the operator and the encode conditions such as the resolution. In a case where the distributed encode processing is performed, the processing advances to a processing in step S102, and in a case where the distributed encode processing is not performed, the processing advances to a processing in step S108.

In step S102, the material dividing circuit 201 divides the data of the encode material, for example, into the number of PCs constituting the distributed encoding circuits 202a to 202d. Herein, if the PCs having the same spec are prepared and the division data is evenly allocated to the respective PCs, it is possible to efficiently perform the encode processing.

In step S103, the respective distributed encoding circuits 202a to 202d perform the encode processing on the material division data and also generate the decode information file. The distributed stream subjected to the encode processing is stored in the storage unit of the distributed stream decode processing circuit 204, and the decode information file is stored in the storage unit of the decode image generation circuit.

In step S104, the decode image generation circuit determines whether or not specification information from the operator such as the decode range and the order exists. In step S104, in a case where the specification information exists, the processing advances to a processing in step S105, and in a case where the specification information does not exist, the processing advances to a processing in step S106.

In step S105, the decode image generation circuit generates the decode image data on the basis of the decode-specified specification information and the decode information file. This decode image data regulates, for example, a predetermined decode range or the like by way of the specification information.

In step S106, the decode image generation circuit generates the decode image data on the basis of the decode information file. This decode image data is obtained, for example, by joining information of the decode information file.

In step S107, the distributed stream decode processing circuit 204 performs the decode processing for the distributed streams while following the decode image data generated in step S105 or S106.

In step S108, one of the distributed encoding circuits 202a to 202d performs the entire encode material data which is not divided in the encode processing on the material dividing circuit 201 into the encode data. Also, the decode information file of the data of the entire material is generated.

In step S109, the distributed stream decode processing circuit 204 performs the decode processing of the encode data on the basis of the decode information file of the entire material data.

In this manner, when the encode parallel processing is executed, the respective decode information files are generated. By executing the decode processing operation without joining the distributed stream subjected to the parallel processing on the basis of this decode information file, it is possible to improve the operation efficiency for the disk creation.

Next, specific processings in the decode image generation circuit 203 and the distributed stream decode processing circuit 204 will be described with reference to FIGS. 10 and 11.

FIG. 10A is a schematic drawing of the decode information files of distributed streams 1 to 3. In the decode information file of the distributed stream 1, information is included such as the start time code (01:00:00:00), the end time code (01:10:23:10), the duration (10:23:10), the resolution (1920×1080), the frame rate (59.94i), and the picture type (I, B, B, P, . . . ). Also, in the decode information file of the distributed stream 2, information is included such as the start time code (01:10:23:11), the end time code (01:25:18:07), the duration (14:54:26), the resolution (1920×1080), the frame rate (59.94i), and the picture type (I, B, B, P, . . . ). Also, in the decode information file of the distributed stream 3, information is included such as the start time code (01:25:18:08), the end time code (01:40:00:00), the duration (14:41:22), the resolution (1920×1080), and the frame rate (59.94i), the picture type (I, B, B, P, . . . ).

Herein, a case in which the decode position (01:18:00:00) is specified as shown in FIG. 10B will be described. First, the distributed stream at the specified time code (01:18:00:00) is determined. For example, by comparing the specified time code (01:18:00:00) with the respective end time codes of the decode information files of the distributed streams, the distributed stream is determined as the distributed stream 2.

Next, from the start time code of the distributed stream, the duration is calculated. To be more specific, the duration (07:36:19) from the start time code of the decode information file of the distributed stream 2 (01:10:23:11) to the specified time code (01:18:00:00) is calculated.

Next, the duration is converted into a frame count. The position of the specified frame count is calculated, for example, from the time (07:36:19) and the frame rate through the following expression.

$$7 \times 60 \times 30 + 36 \times 30 + 19 = 13699 \text{ frames}$$

Next, the I picture locating immediately before the specified frame count position is detected. To be more specific, by referring to the picture type information included in the decode information file of the distributed stream 2, the I picture position locating immediately before the decode-specified position (13692 frames) is detected. Also, the decode image generation circuit 203 generates the decode image data in which decode is performed from the frame position of 13692 to be skipped to the specified position.

Next, the distributed stream decode processing circuit 204 skips to the specified position through the GOP decode of the specified time code of the decode image data. That is, the distributed stream decode processing circuit 204 inputs the distributed stream 2 and jumps to the frame 13692. Then, by performing the frame advance by seven frames, the shift is made to the specified time code position.

Next, the decode is started from the specified time code, and the picture at the specified time code position is output.

By performing the decode operation on the basis of the decode information file in the above-mentioned manner, it is possible to perform the operations such as the reproduction, the reverse reproduction, the frame advance, and the jump on the distributed stream as if one stream is dealt with, and the operations such as the image quality check and the title creation can be efficiently performed.

In addition, by specifying the decode position as described above, it is possible to perform an arbitrary decode on the distributed streams as shown in FIG. 11.

Figure 11A:
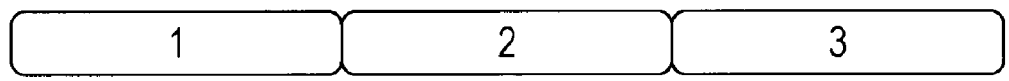
FIG. 11 is an explanatory diagram for describing a decode processing of the distributed stream.

As shown in FIG. 11A, in a case where a continuous decode for simply joining the distributed streams 1 to 3 is performed, the decode image generation circuit 203 generates the decode image data on the basis of the decode information files of the distributed streams 1 to 3. That is, this decode image data includes the start time code of the distributed stream 1 and the end code of the distributed stream 3.

Figure 11B:
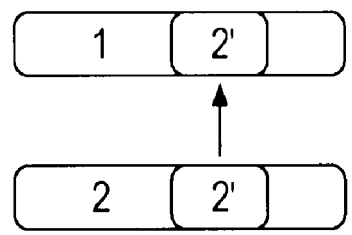

Also, as shown in FIG. 11B, in a case where a part of the distributed stream 1 is replaced, the decode image generation circuit 203 generates decode image data including the start time code and the end code of the distributed stream 1 and the start time code and the end code of a partial stream 2'.

Figure 11C:
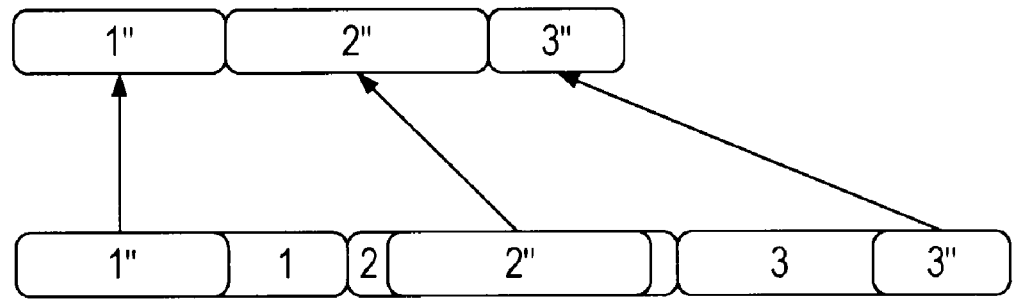

In addition, FIG. 11C illustrates parts of the distributed streams 1 to 3 which are joined one another. In this case, the decode image generation circuit 203 generates decode image data including the start time code and the end code of a partial stream 1", the start time code and the end code of the partial stream 2", and the start time code and the end code of a partial stream 3".

By creating the decode image data with use of the decode information file in the above-mentioned manner, it is possible to create the trailer movie by using the distributed streams without additionally performing the editing processing on the material for the trailer movie as in the related art. For example, by specifying the range for performing the decode processing on the basis of the decode information file and simply creating the encode image information obtained by joining the respective distributed streams, the artificial decode operation for the trailer movie can be performed. Also, in a case where a correction is performed in terms of the image quality, the encode can be immediately performed again, so that it is possible to improve the efficiency of the material check procedure and the final image quality check procedure.

In the above, the present invention has been described with reference to the particular embodiments. However, it should be understood by those skilled in the art that various modifications may occur as they are within the scope of the appended claims or the equivalents thereof.

For example, in a case where the above-mentioned series of processings are also executed by using software, the program constituting the software is installed into a computer incorporated in a dedicated-use hardware via a network or a recording medium. Alternatively, the program is installed into a general-use computer or the like capable of executing various processings by installing various programs, for example.

In addition, the recording medium including such programs is distributed for providing the programs to the user separately from the apparatus main body. For example, the recording medium includes a magnetic disk on which the programs are recorded (including a flexible disk), an optical disk (including a CD-ROM (Compact Disk-Read Only Memory) or a DVD (Digital Versatile Disk)), an opto-magnetic disk (including an MD (Mini-Disk)), and a removal recording medium composed of a semiconductor memory or the like (package media). Also, the recording medium may also be composed of a ROM or hard disk on which the programs are recorded and which is previously installed into the apparatus main body when being provided to the user.

It should be noted that in the present specification, the processing includes not only a case where the steps describing the programs recorded on the recording medium are executed in a time series manner in the stated order but also a case where the steps are not regularly executed in a time series manner but are executed in parallel or individually.

The present application contains subject matter related to that disclosed in Japanese Priority Patent Application JP 2008-103983 filed in the Japan Patent Office on Apr. 11, 2008, the entire content of which is incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system comprising:
a division unit configured to divide encoding target data into plural divided data;
a distributed encoding unit configured to encode the plural divided data into plural distributed encode data and generate, for each of the plural distributed encode data, a decode information file including time information and frame information describing plural frames included in the respective one of the plural distributed encode data;
a generation unit configured to identify a decode information file corresponding to one of the plural distributed encode data including a target time point in the encoding target data and configured to identify at least one target frame in the one of the plural distributed encode data corresponding to the target time point based on the identified decode information file corresponding to the one of the plural distributed encode data including the target time point; and
a decoding unit configured to decode only the identified at least one target frame in the one of the plural distributed encode data including the target time point to generate at least one decoded target frame corresponding to the target time point.

2. The image processing system according to claim 1, wherein each of the decode information files includes at least one piece of information selected from a start time code, an end time code, a duration, a resolution, a frame rate, and a picture type.

3. An image processing method comprising:
dividing encoding target data into plural divided data;
encoding, using an encoding processor, the plural divided data into plural distributed encode data and generating, for each of the plural distributed encode data, a decode information file including time information and frame information describing plural frames included in the respective one of the plural distributed encode data;
identifying a decode information file corresponding to one of the plural distributed encode data including a target time point in the encoding target data;
identifying at least one target frame in the one of the plural distributed encode data corresponding to the target time point based on the identified decode information file corresponding to the one of the plural distributed encode data including the target time point; and
decoding only the identified at least one target frame in the one of the plural distributed encode data including the target time point to generate at least one decoded target frame corresponding to the target time point.

4. A non-transitory computer-readable storage medium storing computer-readable instructions thereon, which, when executed by a computer, cause the computer to execute an image processing method, the method comprising:
dividing encoding target data into plural divided data;
encoding the plural divided data into plural distributed encode data and generating, for each of the plural distributed encode data, a decode information file including time information and frame information describing plural frames included in the respective one of the plural distributed encode data;
identifying a decode information file corresponding to one of the plural distributed encode data including a target time point in the encoding target data;
identifying at least one target frame in the one of the plural distributed encode data corresponding to the target time point based on the identified decode information file corresponding to the one of the plural distributed encode data including the target time point; and
decoding only the identified at least one target frame in the one of the plural distributed encode data including the target time point to generate at least one decoded target frame corresponding to the target time point.

5. The image processing system according to claim 1, wherein the generation unit identifies the one of the plural distributed encode data including the target time point by comparing the target time point to a start time code and an end time code included in the decode information file corresponding to each of the plural distributed encode data.

6. The image processing system according to claim 1, wherein the generation unit determines a number of frames between a beginning of the one of the plural distributed encode data including the target time point and the target time point based on a start time code and a frame rate included in the decode information file corresponding to the one of the plural distributed encode data including the target time point.

7. The image processing system according to claim 1, wherein the generation unit identifies an I frame located immediately prior to the target time point based on the frame information included in the decode information file corresponding to the one of the plural distributed encode data including the target time point.

8. The image processing system according to claim 1, wherein the decoding unit generates the at least one decoded target frame corresponding to the target time point by partially decoding the one of the plural distributed encode data including the target time point.

9. The image processing method according to claim 3, wherein the decoding includes generating the at least one decoded target frame corresponding to the target time point by partially decoding the one of the plural distributed encode data including the target time point.

10. The non-transitory computer-readable storage medium according to claim 4, wherein the decoding includes generating the at least one decoded target frame corresponding to the target time point by partially decoding the one of the plural distributed encode data including the target time point.

11. The image processing system according to claim 1, wherein the target time point in the encoding target data is based on user input.

12. The image processing method according to claim 3, wherein the target time point in the encoding target data is based on user input.

13. The non-transitory computer-readable storage medium according to claim 4, wherein the target time point in the encoding target data is based on user input.

* * * * *